GEORGE W. GREGORY.
Improvement in Pulley Attachment for Raising Weights.
No. 4,382. Reissued May 16, 1871.
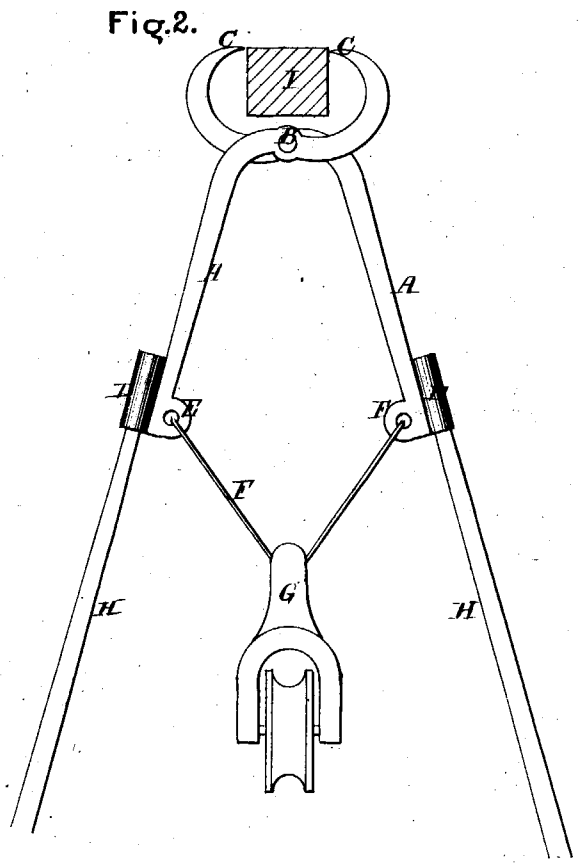
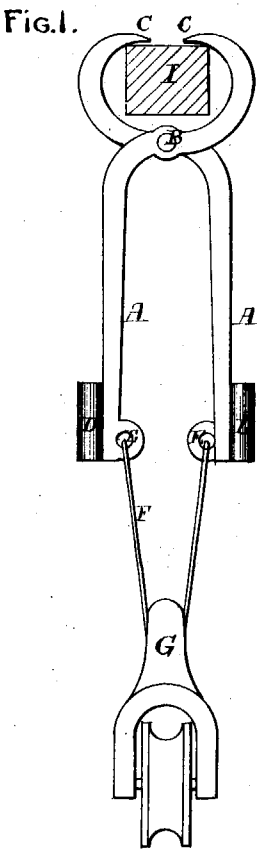
Witnesses
A. Norris
W. E. Castle
G. W. Gregory
By his attys. Howson & Son.
AM. PHOTO-LITHOGRAPHIC CO. N.Y. (OSBORNE'S PROCESS.)

UNITED STATES PATENT OFFICE.

GEORGE W. GREGORY, OF NEW YORK, N. Y.

IMPROVEMENT IN PULLEY ATTACHMENT FOR RAISING WEIGHTS.

Specification forming part of Letters Patent No. 57,125, dated August 14, 1866; antedated February 14, 1866; Reissue No. 2,784, dated October 22, 1867; Reissue No. 2,939, dated May 19, 1868; Reissue No. 4,382, dated May 16, 1871.

*To all whom it may concern:*

Be it known that I, GEORGE W. GREGORY, of New York, county of New York, State of New York, have invented a Pulley Attachment for Raising Weights, of which the following is a specification:

My invention relates to mechanism to be used in connection with the hoisting-rope of a fork for elevating and depositing hay, straw, &c.; and my invention consists of a pulley-support so constructed that it can be placed on a beam or rafter, and made to embrace or gripe the same, and thus sustain the pulley and hoisting-rope without resorting to the usual tedious plan of mounting to the said beam or rafter, and then affixing the supporter by screw or other attachments; my invention being also such that the support can be moved along the beam or rafter from place to place without direct manipulation of the support itself.

Referring to the accompanying drawing, Figure 1 is a perspective view of a pulley-support embracing the beam or rafter; Fig. 2, a perspective view of the support detached from the beam.

Before I proceed to describe my invention, it may be well to state that in operating hay-forks the pulleys have to be suspended from a beam or rafter, and that their position must be changed from time to time in accordance with the points where the hay has to be deposited.

Heretofore it has been the practice to secure the block in which the pulley revolves to a beam or rafter by lashing it to the same, or by the employment of screw-fastenings—duties which involved the necessity, on the part of an attendant, of ascending to the beam by means of a ladder, or otherwise, and then affixing the supporter by the exercise of tedious manipulation; and it was necessary to repeat this manipulation whenever the position of the pulley had to be changed.

I overcome these difficulties in a manner which I will now proceed to describe, reference being had to the accompanying drawing.

The pulley-support is, in the present instance, composed of two bent arms, A A, so pivoted together at B as to form a grapple, the hooks *c c* of which are arranged to embrace or gripe the sides of the beam or rafter I. The arms A A of the support or grapple are provided with sockets D and eyes E, (for which equivalent devices may be substituted,) the former for receiving the ends of poles or other suitable instruments or appliances by which the pulley-support can be affixed to the beam, in the first instance, without ascending to the same, and without direct manipulation of the support itself, and by which the support can be changed from place to place by an operator below.

The hoisting-rope, chain, or cord T is first passed through the eye of the pulley and then attached to the eyes E. The whole is then elevated, by the poles or their equivalent, toward the beam or rafter, until the latter is embraced or seized by the grapple, from which the elevating mechanism may now be detached; for the weight of the supporter itself, in addition to the strain exerted on it by the fork and its load, will tend to increase the griping or embracing effect of the support on the beam or rafter.

It will be unnecessary to explain how the support may be moved from place to place on the rafter without ascending to the beam.

I am aware that grapples similar, as regards general appearance, to that described have been used for various purposes, but none, as far as I am aware, have been constructed and arranged for being affixed to or so made as to be self-affixing to an elevated object without requiring direct manipulation. I therefore do not desire to confine myself to the specific construction or arrangement of the supporter, or of the appliances by which it is indirectly manipulated; but

I claim—

1. A pulley-supporter so constructed as to be placed in position, substantially in the manner described.

2. The said adjustable pulley-supporter, having sockets, or their equivalent, for the purpose specified.

In testimony whereof I have signed my name to this specification in the presence of two subscribing witnesses.

GEO. W. GREGORY.

Witnesses:

JNO. CAMHURST,
G. W. WOOLLEY.